US010824699B2

(12) United States Patent
Bertsch et al.

(10) Patent No.: US 10,824,699 B2
(45) Date of Patent: *Nov. 3, 2020

(54) MANUFACTURE OF SECURE PRINTED IMAGE INVENTORIES

(71) Applicant: Eight Plus Ventures, LLC, Santa Monica, CA (US)

(72) Inventors: Christoph Bertsch, Pacific Palisades, CA (US); Rodney Lake, Santa Monica, CA (US); Douglas Sturgeon, Half Moon Bay, CA (US); Anthony Sziklai, Oak Park, CA (US)

(73) Assignee: Eight Plus Ventures, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,213

(22) Filed: Oct. 30, 2019

(65) Prior Publication Data

US 2020/0065457 A1 Feb. 27, 2020

Related U.S. Application Data

(63) Continuation of application No. 16/399,739, filed on Apr. 30, 2019, now Pat. No. 10,467,391, which is a (Continued)

(51) Int. Cl.
*G06F 21/00* (2013.01)
*G06F 21/16* (2013.01)
(Continued)

(52) U.S. Cl.
CPC .............. *G06F 21/16* (2013.01); *G06F 21/44* (2013.01); *G06F 21/62* (2013.01); *G06T 1/0021* (2013.01)

(58) Field of Classification Search
CPC .......... G06F 21/16; G06F 21/44; G06F 21/62; G06T 1/0021
See application file for complete search history.

(56) References Cited

U.S. PATENT DOCUMENTS 6,657,702 B1 * 12/2003 Chui ................... G03D 15/005
355/40
7,209,571 B2 4/2007 Davis et al.
(Continued)

OTHER PUBLICATIONS

Ando et al. image Recognition Based Digital Watermarking Technology for Item Retrieval in Convenience Stores, journal, Feature Articles: Creating New Services with corevo-NTT Group's Artificial Intlligence Technology, vol. 15 No. 8, published Aug. 2017, 6 pages.

(Continued)

*Primary Examiner* — Mahfuzur Rahman
(74) *Attorney, Agent, or Firm* — SoCal IP Law Group LLP; Nikki M. Dossman; Steven C. Sereboff (57) ABSTRACT

There are disclosed methods and apparatus to manufacture an inventory of finished physical print products from a base work including one or more images. Print metadata is assigned to each print of an image from the base work, the print metadata including an identification of the base work and a provenance of the base work. For each print, at least one cryptographic hash is generated of the image, the print metadata, and an index value of a security feature embedded into a physical substrate on which the image is printed. The cryptographic hash is then written to a node of a transaction processing network.

24 Claims, 8 Drawing Sheets

Related U.S. Application Data continuation-in-part of application No. 16/110,831, filed on Aug. 23, 2018, now Pat. No. 10,296,729.

(51) Int. Cl.
*G06F 21/62* (2013.01)
*G06T 1/00* (2006.01)
*G06F 21/44* (2013.01)

(56) References Cited

U.S. PATENT DOCUMENTS

| | | |
|---|---|---|
| 7,668,869 B2 | 2/2010 | Weinberger |
| 8,494,231 B2 | 7/2013 | Folta |
| 9,690,967 B1 | 6/2017 | Brundage et al. |
| 10,142,381 B2 | 11/2018 | Nathan |
| 10,256,829 B1 | 4/2019 | Bertsch |
| 10,296,729 B1* | 5/2019 | Bertsch ............... H04L 9/0643 |
| 10,325,156 B1 | 6/2019 | Bertsch |
| 10,467,391 B1* | 11/2019 | Bertsch ............... G06F 21/16 |
| 2002/0012445 A1* | 1/2002 | Perry .................. G06Q 10/00 382/100 |
| 2002/0146123 A1 | 10/2002 | Tian |
| 2004/0153649 A1 | 8/2004 | Rohads et al. |
| 2004/0201751 A1 | 10/2004 | Bell |
| 2005/0010792 A1 | 1/2005 | Carpentier et al. |
| 2005/0069171 A1* | 3/2005 | Rhoads ................ G06Q 30/02 382/100 |
| 2006/0103736 A1 | 5/2006 | Obrador |
| 2006/0130118 A1 | 5/2006 | Damm |
| 2006/0251338 A1 | 11/2006 | Gokturk |
| 2007/0061895 A1 | 3/2007 | Ceraolo |
| 2007/0165253 A1 | 7/2007 | Usui |
| 2008/0049971 A1 | 2/2008 | Ramos et al. |
| 2008/0127270 A1 | 5/2008 | Shipman et al. |
| 2008/0228733 A1 | 9/2008 | Davis et al. |
| 2008/0243898 A1 | 10/2008 | Gormish |
| 2009/0141932 A1 | 6/2009 | Jones |
| 2010/0059380 A1 | 3/2010 | Rohads et al. |
| 2010/0080471 A1 | 4/2010 | Haas et al. |
| 2010/0309226 A1 | 12/2010 | Quack |
| 2012/0106806 A1 | 5/2012 | Folta et al. |
| 2013/0003126 A1 | 1/2013 | Van Osdol et al. |
| 2013/0174268 A1* | 7/2013 | Wang .................. G06F 21/62 726/26 |
| 2014/0049653 A1 | 2/2014 | Leonard et al. |
| 2014/0214885 A1 | 7/2014 | Park |
| 2014/0331137 A1 | 11/2014 | McKoen |
| 2015/0100578 A1 | 4/2015 | Rosen et al. |
| 2015/0172787 A1 | 6/2015 | Geramifard |
| 2015/0178786 A1 | 6/2015 | Claessens |
| 2016/0285631 A1 | 9/2016 | Deleeuw |
| 2016/0342937 A1 | 11/2016 | Kerrick |
| 2016/0379330 A1 | 12/2016 | Powers |
| 2017/0140346 A1 | 5/2017 | Whitehouse |
| 2017/0243179 A1 | 8/2017 | Dehaeck |
| 2018/0046889 A1 | 2/2018 | Kapinos et al. |
| 2018/0121635 A1 | 5/2018 | Tormasov et al. |
| 2018/0136633 A1* | 5/2018 | Small ............... G05B 19/4099 |
| 2018/0253567 A1 | 9/2018 | Gonzalez-Banos et al. |
| 2018/0257306 A1 | 9/2018 | Mattingly et al. |
| 2018/0261307 A1 | 9/2018 | Couse |
| 2018/0278423 A1 | 9/2018 | Bianzino |
| 2019/0045207 A1 | 2/2019 | Chen |

OTHER PUBLICATIONS

Cryptoart, "Cryptoart is like a piggy bank. Each art piece physically stores Bitcoin. Each art piece also includes an easy 3-step guide to understanding Bitcoin", online article, https://cryptoart.com/how-cryptoart-works/, last accessed Jul. 25, 2018, 3 pages.

R.A.R.E., A new age platform for collecting unique, scarce digital art, cultivating the next generation of artists and collectors, https://www.rareart.io/#How-RARE-Works, last accessed Jul. 25, 2018, 6 pages.

World Intellectual Property Organization, International Search Report and Written Opinion, for International Application No. PCT/US2019/043671, dated Sep. 4, 2019, 3 total pages.

World Intellectual Property Organization, International Search Report and Written Opinion, for International Application No. PCT/US2019/043676, dated Sep. 9, 2019, 8 total pages.

World Intellectual Property Organization, International Search Report and Written Opinion, for International Application No. PCT/US2019/035869, dated Jul. 17, 2019, 10 total pages.

World Intellectual Property Organization, International Search Report and Written Opinion, ffor International Applicatio No. PCT/US2019/036061, dated Oct. 7, 2019, 8 total pages.

\* cited by examiner

MANUFACTURE OF SECURE PRINTED IMAGE INVENTORIES

RELATED APPLICATION INFORMATION

This patent application is a continuation of patent application Ser. No. 16/399,739 filed Apr. 30, 2019 entitled MANUFACTURE OF SECURE PRINTED IMAGE INVENTORIES, which is a continuation-in-part of patent application Ser. No. 16/110,831 filed Aug. 23, 2018 and entitled MANUFACTURE OF INVENTORIES OF IMAGE PRODUCTS, now U.S. Pat. No. 10,296,729 issued May 21, 2019, both of which are incorporated by reference in their entirety.

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to production of physical prints from digital images.

Description of the Related Art

A movie is a collection of still images that are shown one after the other in quick succession. When the images are viewed in quick succession (approximately 24 images per second), the human brain interprets the images as a motion picture or movie. Therefore, a traditional movie that is shown in theaters is a display of images in quick succession on the order of approximately 24 images per second, or 129,600 images for a 90-minute movie (24 images per second×60 seconds per minute×90 minutes). Movies made in non-digital (e.g., photographic film) media can be converted to digital format, and the converted movies as well as movies originally made in digital format can have individual images extracted from the master digital media file. Physical (e.g., hardcopy) prints can be made from the still images.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
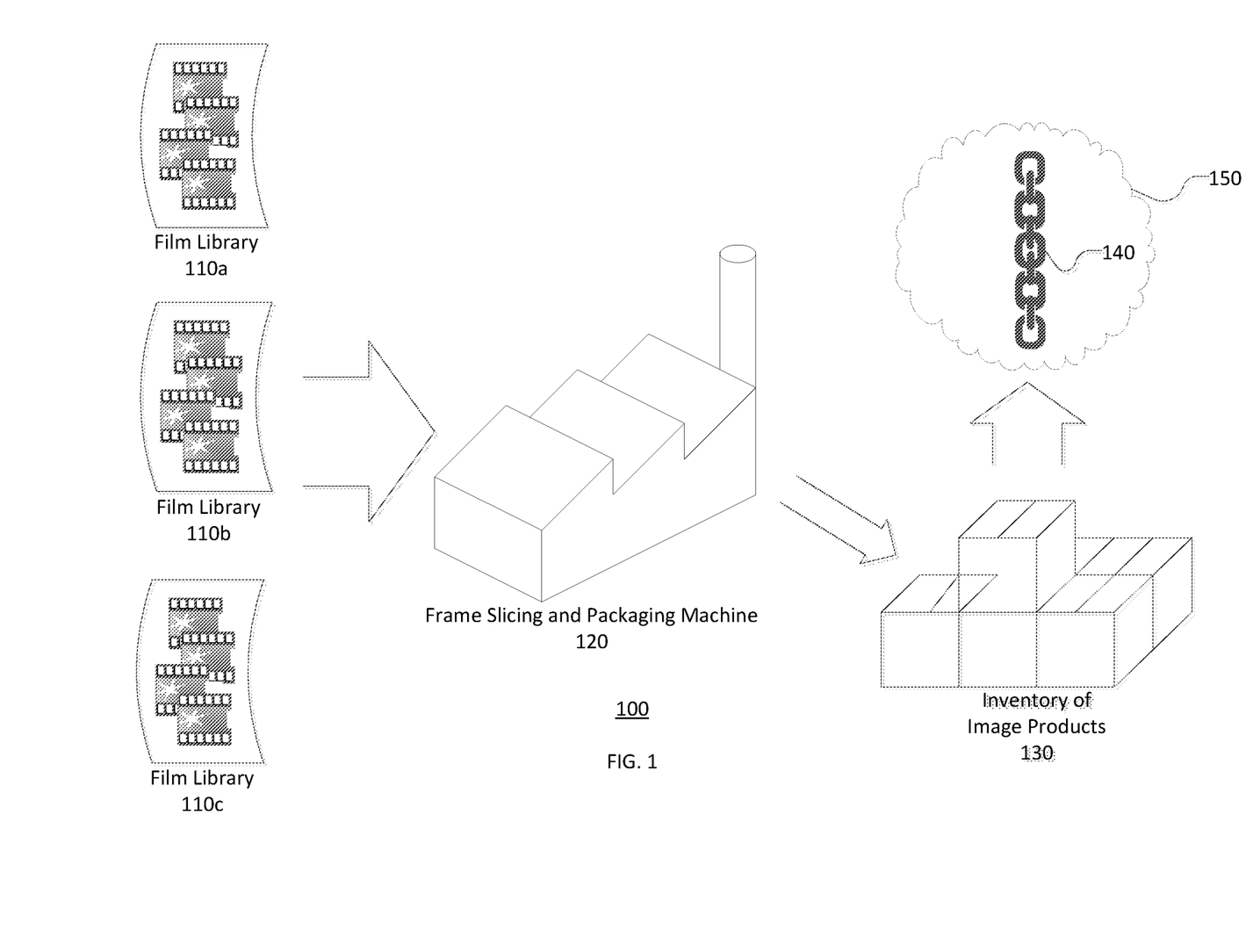
FIG. 1 is a block diagram of a system for production of inventories of image products.

Referring now to FIG. 1 there is shown a block diagram of a system 100 for production of inventories of image products. The system 100 includes one or more film libraries 110*a*, 110*b*, 110*c*, a frame slicing and packaging machine 120, an inventory of image products 130, and one or more transaction processing nodes 140.

The film libraries 110*a*, 110*b*, 110*c* each include a collection of one or more whole movies, videos, and/or movie trailers, and/or portions thereof (e.g., clips), each of which is a sequence of frames having a respective still image. These items in a film library will be referred to herein as a base work. A base work may be a single frame, i.e., a still image, such as a picture or a drawing, in analog or digital format. The base works may be in analog or digital format, and each film library 110*a*, 110*b*, 110*c* may be exclusive to a particular form or format of base work. Some film libraries may have base works in assorted forms and/or formats, related or unrelated. The frames of a base work may have various objects, such as people, animals, goods, physical structures or text in a frame. A given frame may include audio and subtitles.

Figure 2:
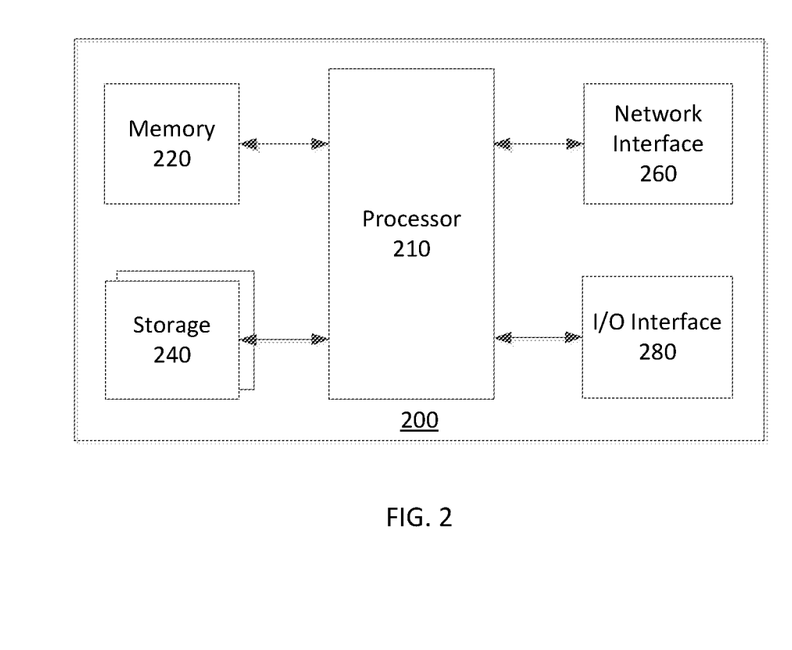
FIG. 2 is a block diagram of a computing device.
Figure 4:
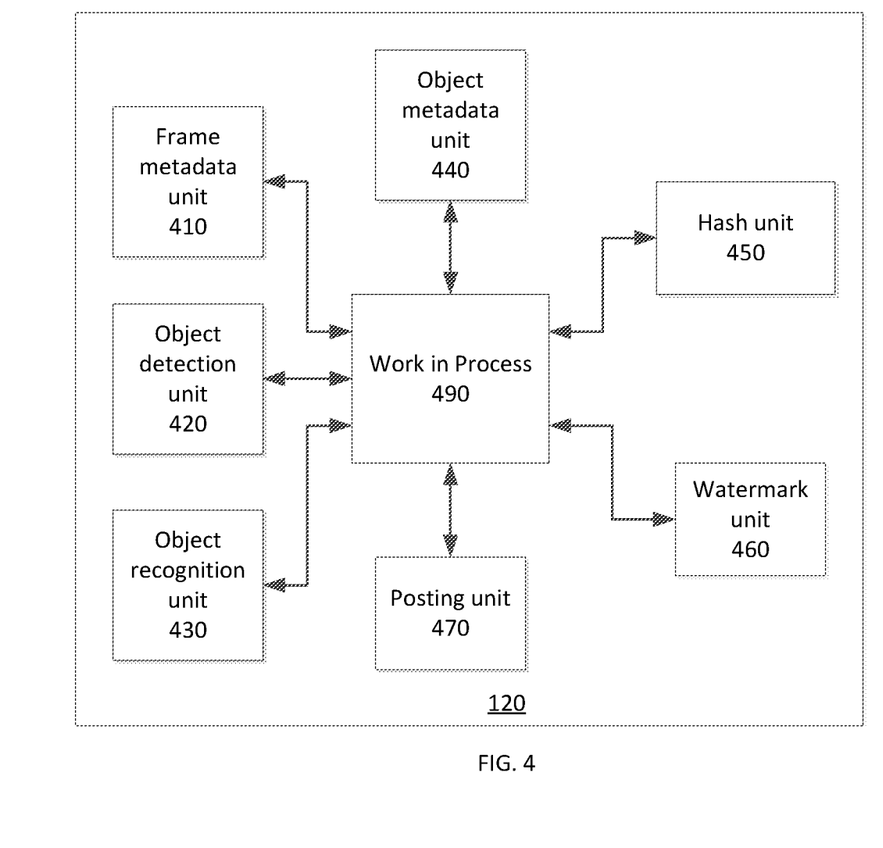
FIG. 4 is a block diagram of a frame slicing and packaging machine.

The frame slicing and packaging machine 120 produces the inventory of image products 130 and moves them into the transaction processing nodes 140. The frame slicing and packaging machine 120 may be a computer system, such as shown in FIG. 2, including one or more non-volatile machine-readable media storing a program having instructions which when executed by a processor will cause the processor to produce the inventory of image products 130. As shown in FIG. 4, the frame slicing and packaging machine 120 may include a frame metadata unit 410, an object detection unit 420, an object recognition unit 430, an object metadata unit 440, a hash unit 450, a watermark unit 460, and a posting unit 470. These units 410, 420, 430, 440, 450, 460, 470 interact with a work in process subsystem 490, which may be the storage 240 (FIG. 2). The posting unit 470 may effectuate its work through the I/O interface 280 (FIG. 2).

Artificial intelligence may be incorporated into or used by the frame metadata unit 410, the object detection unit 420, the object recognition unit 430 and/or the object metadata unit 440. Accordingly, these units 410, 420, 430, 440 may be trained to perform the corresponding work prior to going into production. These units 410, 420, 430, 440 may employ quality assurance, such as use of human checks on samples of the production output, which may be used as feedback for refinement of the training.

Each finished image product in the inventory 130 is a chattel good, capable of transfer on an individual basis.

The transaction processing nodes 140 may be in an information technology cloud 150, such as cloud storage. The transaction processing nodes 140 may be in a blockchain.

Figure 3:
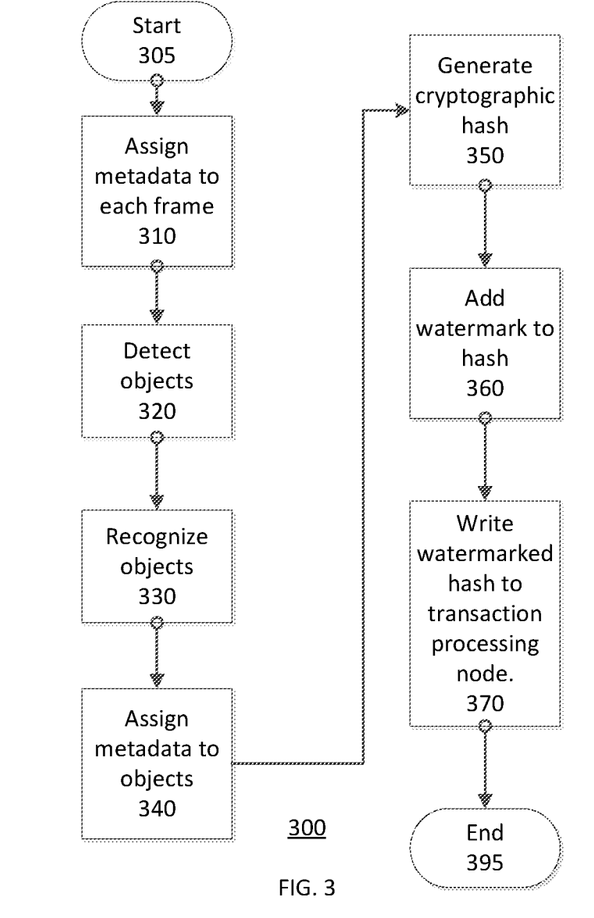
FIG. 3 is a flowchart of a process for production of inventories of image products.

Referring now to FIG. 3 there is shown a flowchart 300 of a process for production of image inventories. The process 300 may be performed by the frame slicing and packaging machine 120 of FIG. 1 and FIG. 4, having as inputs the film libraries 110*a*, 110*b*, 110*c*, etc. and manufacturing the inventory of image products 130. The flow chart 300 has both a start 305 and an end 395, but the process is cyclical in nature.

After starting 305, the process may include some preprocessing. This preprocessing may include extraction of base works from the film libraries into the work in process subsystem 490, and extraction of frames from a base work. The base work may be on an analog physical medium such as celluloid film, and preprocessing may include scanning the analog film medium into a digital file. If the base work is in analog form it may be converted to digital form. Preprocessing results in the base work, in digital form, being stored in the work in process subsystem 490.

During preprocessing, a human operator may select which frames should be included or excluded from further processing by the frame slicing and packaging machine. Frame selection criteria may include metadata about the frames. The operator may be provided with options for frame selection, such as actors. For example, if the film Butch Cassidy and the Sundance Kid was being preprocessed, the operator could choose to process only the frames having video and/or audio of Butch Cassidy (played by Paul Newman), or only the frames showing his face.

Next, metadata is assigned to each frame of the digital video work (step 310). This may be performed by the frame metadata unit 410. The frame metadata may include an identification of the work, provenance of the work, an identification of the processor, and an identification of the frame within the work. The metadata may include: colors in the frame; tags previously assigned to the frame that describe the frame; and geographic location represented in the frame. The provenance of the work may include: the identity of the frame slicing and packaging machine; the geographic location and timestamp where the frame was originally produced or subsequently processed; names or other identification of the people, equipment and firms which did the production and processing; language and subtitles; details of how the production and processing were performed; and details of errors and errata from the production and processing. Metadata for a given frame may include a sequence of images from immediate prior and or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; and/or studio.

Metadata for frames of still images may include: title or identity of the collection or sub-collection of which the image is a part; artist; subject; category; album; session; sequence; session index; sequence index; camera used; number of photographs in the album, session and/or sequence.

Next, objects in each frame are detected (step 320). This may be performed by the object detection unit 420. The object detection step may include differentiation from a series of frames, for example using a Kalman filter on the images to recognize objects in motion.

Next, the detected objects are recognized (step 330). This may be performed by the object recognition unit 430. These objects may be recognizable generically or with varying specificity. For example, an object may be recognized generically as a person, or as a specific type of person (e.g., adult, child, male, female, star actor, extra), or as a specific person (e.g., Mae West or John F. Kennedy). Recognition of audio objects may include speech to text conversion. Frames may include text objects, such as signs or labels in an image.

Next, metadata is assigned to the recognized objects (step 340). This may be performed by the object metadata unit 440. This metadata may include the location in the frame of the object and recognition of the object (i.e., identification of what the object is). The metadata may include an image of the object (e.g., an actor). The metadata of a person may include the actor's name. The metadata for audio objects may include spoken lines and sounds.

The metadata may link objects from within frames or across frames. For example, audio may be linked to the object in the image which produces the audio. In this way lines of dialogue may be linked to the actor speaking the lines. In this way, in Gone with the Wind, Rhett Butler (played by Clark Gable) may be linked to the line, "Frankly, my dear, I don't give a damn." Likewise, recitations of "May the Force be with you" in a Star Wars film may be linked to each actor reciting this line. Or, the sound of a gunshot may be linked to the image of the gun, or to a person struck, such as in the movie The Matrix, when Neo (played by Keanu Reeves) is shot.

Additional frame or object metadata may include whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Ariz., appearing in the frame; popular or famous objects, such as the Millennium Falcon, appearing in the frame; desired color composition appearing in the frame; quality of preservation or original source media, as whether it is deteriorated or is damaged; and/or pre-existing value of adjacent segments or frames.

Next, for each frame, a cryptographic hash is generated of the frame's image, the frame metadata, and the object metadata to produce the image product (step 350). This may be performed by the hash unit 450, which encrypts information items about a frame along with the frame itself into a hash value that uniquely identifies the frame and information items about the frame. Thus, if even a single digital bit is changed in the files of the frame and information items about the frame that are input into the cryptographic hashing algorithm, the resulting hash value will be completely different from the hash value before the digital bit was changed. The hash unit 450 may produce a hash value from the representation of the image file along with the frame and object metadata. This hash value is more efficient and technologically superior to prior art index prints which aim to confirm that an individual print is part of a collection of prints shown in the index print.

The cryptographic hashing of the image from a frame with the metadata is performed to be able to objectively and transparently confirm authenticity of the image and the metadata into the future. This allows reliable chain of title and chain of custody tracking and can support a reliable market for the image.

Next a watermark may be added to the hash (step 360) to protect the linkage of the image file with its hashed value from malicious tampering. This may be performed by the watermark unit 460. The watermark unit 460 packages the hash value with the corresponding frame.

Next, the watermarked hash is written to a node of a transaction processing network (step 370). This may be performed by the posting unit 470 by generating a transaction to register the watermarked hash along with its record provenance into a blockchain. Writing to the node may be under control of a smart contract. The hash values provided by the hash unit 450, or the packages from the watermark unit 460, are recorded by the posting unit 470 into the transaction processing nodes 140, which may be in a secure transaction processing network, distributed ledger or blockchain, or other transaction processing environment. The distributed ledger may be an immutable distributed ledger.

The image products, as stored into nodes in the transaction processing network, have images which are exactly the same as the base works. However, after an image product has been produced and saved to the transaction processing node 140, it may be desirable to produce finished physical prints, referred to herein as finished physical print products. The finished physical print products are real, permanent physical items (i.e., not merely transitory image displays).

Figure 5:
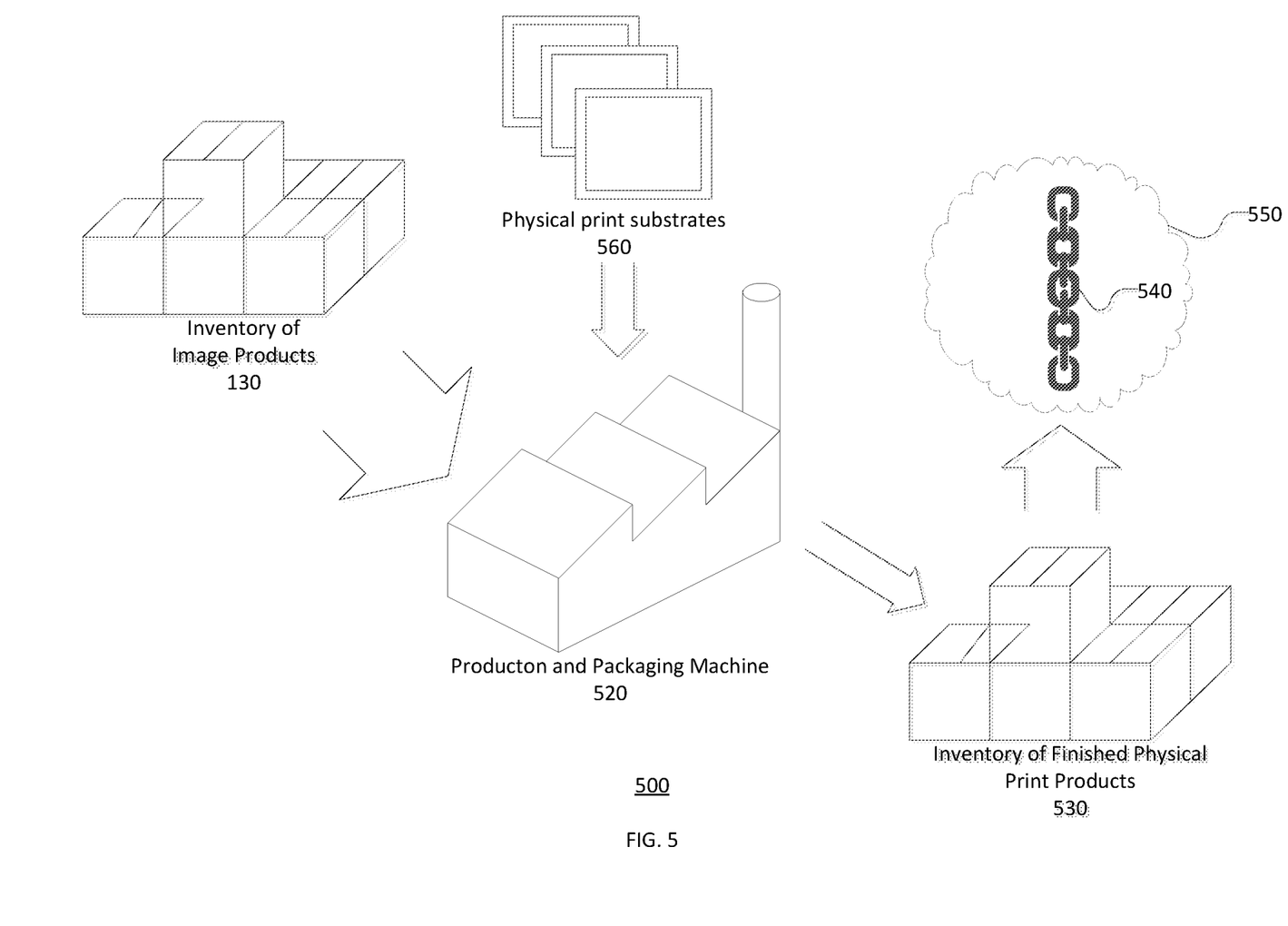
FIG. 5 is a block diagram of a system for production of finished physical print products.

Referring now to FIG. 5 there is shown a block diagram of a system 500 for production of physical print inventories. The system 500 includes one or more finished image product inventories 130, an inventory of physical print substrates 560, a production and packaging machine 520, an inventory of finished physical print products 530, and transaction processing nodes 540.

The production and packaging machine 520 produces the inventory of finished physical print products 530 and registers them in the transaction processing nodes 540. The hash value that was created for the print, metadata that went into creation of the hash value, and any other items of metadata that were inputs into creating the hash value are registered. The production and packaging machine 520 may be a computer system, such as shown in FIG. 2, including one or more non-volatile machine-readable media storing a program having instructions which when executed by a processor will cause the processor to produce the inventory of finished physical print products 530.

Figure 7:
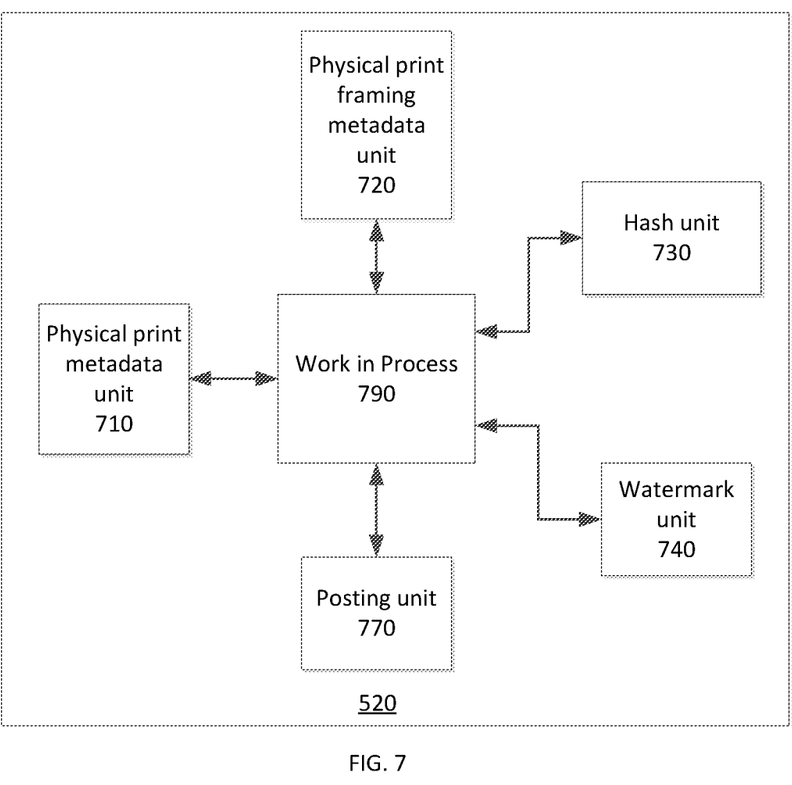
FIG. 7 is a block diagram of a production and packaging machine.

As shown in FIG. 7, the production and packaging machine 520 may include a physical print metadata unit 710, a physical print framing metadata unit 720, a hash unit 730, a watermark unit 740, and a posting unit 770. These units 710, 720, 730, 740, 770 interact with a work in process subsystem 790, which may be the storage 240 (FIG. 2). The posting unit 770 may effectuate its work through the I/O interface 280 (FIG. 2). Physical print framing metadata identifies a decorative and/or protective device that the finished physical print is attached to or mounted in.

Each finished physical print product in the inventory 530 is a chattel good, capable of transfer on an individual basis.

The transaction processing nodes 540 may be the same or different from those in FIG. 1, and may be in the same 150 or a different 550 information technology cloud. The transaction processing nodes may be in a blockchain.

Figure 6:
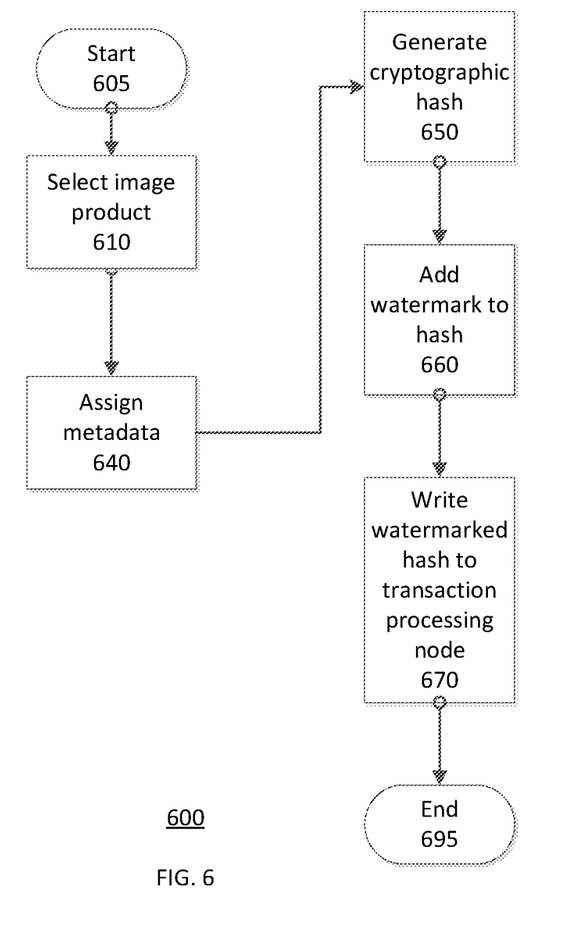
FIG. 6 is a flowchart of a process for production of finished physical print products.

Referring now to FIG. 6 there is shown a flowchart 600 of a process for production of finished physical print products. The process 600 may be performed by the production and packaging machine 520 of FIG. 5 and FIG. 7, having as inputs image products from the inventory 130 items, physical print substrates 560, and manufacturing the inventory of finished physical print products 530. The flow chart 600 has both a start 605 and an end 695, but the process is cyclical in nature.

After starting 605, image products may be selected from the inventory 130 for finishing by the production and packaging machine 520 (step 610). Selection may be by a human operator and/or automated. The operator may be provided with options for selection of image products, such as actors.

Next, metadata is assigned to each physical print of the digital video work being produced (step 640). This may be performed by the physical print metadata unit 710.

Next, metadata relating to the finished physical print product is assigned to the finished physical print product (step 640). This may be performed by the physical print framing metadata unit 720. The metadata may include a copy of the following items already identified in the production of the inventory of image products 130: identification of the work, provenance of the work, an identification of the frame within the work and may include additional new items. The security feature embedded in the physical print substrate material will include an indexed value or code that uniquely identifies that specific security feature from all other security features produced into the future. The metadata may include: colors in the print; effects or filters added to the print; tags previously assigned to the image frame that describe the frame being printed; package elements of the print such as where an image is split into two or more sub-prints to give a sense of motion; physical substrate material the print is printed on; where a physical frame or other protective holding device is ordered with the print, the material the device is composed of; border material, if any; print protective materials; print and frame protective materials, if any; hanging system supplied with the print, if any. The provenance of the work may include: the identity of the production and packaging machine; the geographic location and timestamp of where the print was originally produced or subsequently processed; names or other identification of the people, equipment and firms which did the production and processing; language and subtitles; details of how the production and processing were performed; and details of errors and errata from the production and processing. Metadata for a given image frame that is being printed may include a sequence of images from immediate prior and/or subsequent frames, or thumbnails of them, such as from a video or collection of still images. The metadata for each frame may be stored in a single file, with a CSV, XML or JSON format. The metadata from plural frames may be stored in a database, and the database may also include the correlated images.

Metadata for prints of frames of video may include: frame number in the overall frame count for the movie or segment or video or video clip or trailer being processed; frame number in a given segment or fragment of the whole base work; frame number in its relative position in a given segment or fragment of the base work; license attributes such as whether electronic reproduction and/or hardcopy printing are permitted; genre; category; title of the base work; title of the scene; starting time code; ending time code; duration; frame count; producer; director; studio.

Metadata for prints of frames of still images may include: title or identity of the collection or sub-collection of which the image is a part; artist; subject; category; album; session; sequence; session index; sequence index; camera used; number of photographs in the album, session and or sequence.

Additional frame or object metadata may include whether it is a hero shot, where a famous actor appears in the frame; lead actors, where lead actors who may not be hero level actors, but are still the lead actors for the movie, appear in the frame; other actors that are not lead actors appear in the frame; famous locations, such as Monument Valley, Ariz., appearing in the frame; popular or famous objects, such as the Millennium Falcon, appearing in the frame; desired color composition appearing in the frame; quality of preservation or original source media, as whether it is deteriorated or is damaged; pre-existing value of adjacent segments or frames.

Next, for each frame, a cryptographic hash is generated of the image, the underlying image metadata, and the object metadata (step 650). This may be performed by the hash unit 730, which encrypts information items about a finished physical print product along with the digital file of the corresponding image into a hash value that uniquely identifies the finished physical print product and information items about the image. For example, a physical item is not being hashed, rather information about the physical item, such as the metadata about the physical item, is part of the generation of the hash value. The hash value, along with the metadata items, is recorded to the transaction processing nodes. Thus, if even a single digital bit is changed in the files of the finished physical print product and information items about the finished physical print product that are input into the cryptographic hashing algorithm, the resulting hash value will be completely different from the hash value before the digital bit was changed. The hash unit 730 packages the hash value with the corresponding finished physical print product. This hash value is an efficient and technologically superior confirmation that a particular product is part of a collection of such products, shown in the index print.

The cryptographic hashing of the image is performed to be able to objectively and transparently confirm authenticity of the finished physical print product and the metadata into the future. This allows reliable chain of title and chain of custody and can support a reliable market for the finished physical print product.

Next a watermark may be added to the hash (step 660) to protect the linkage of the image file with its hashed value from malicious tampering. This may be performed by the watermark unit 740. The watermark unit 740 packages the watermarked hash value with the corresponding derivative finished physical print product.

Next, the watermarked hash is written to a node of a transaction processing network (step 670). This may be performed by the posting unit 770 by generating a transaction to register the watermarked hash along with its record provenance into a blockchain. Writing to the node may be under control of a smart contract. The hash values provided by the hash unit 730, or the packages from the watermark unit 740, are recorded by the posting unit 770 into the transaction processing nodes 540, which may be in a secure transaction processing network, distributed ledger or blockchain, or other transaction processing environment. The distributed ledger may be an immutable distributed ledger.

The transaction processing nodes may support queries. Thus, an individual who might want to purchase an image product or a finished physical print product, could make a query to confirm its authenticity.

Figure 8:
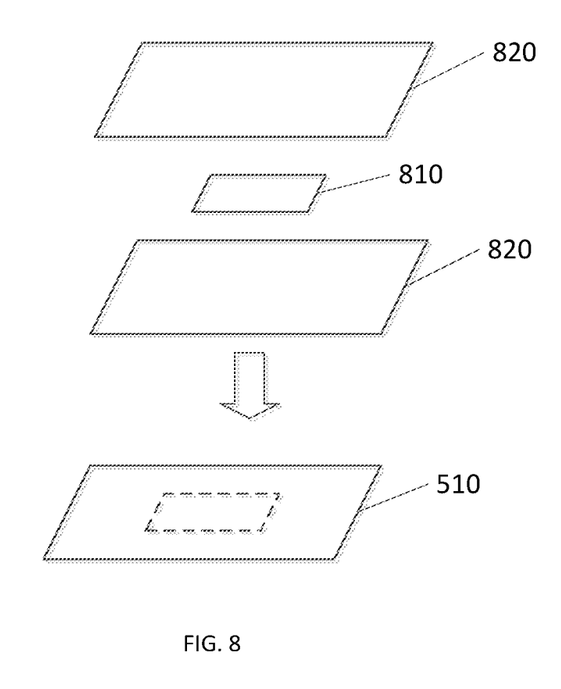
FIG. 8 is a block diagram of a physical security feature incorporated into the substrate material.

FIG. 8 is a block diagram showing a security feature 810 embedded between layers of a substrate 820 of a finished physical print product. The security feature 810 includes a matrix of carbon nanotubes (CNT) that are deposited on the substrate 820 in a pattern that provides unique identification.

Most cryptographic primitives rely on the ability to generate, store and retrieve unique 'keys'. These cryptographic keys (unencrypted) are used as an input to the known encryption engine to generate encrypted output that is used to authenticate the device or information. Conventionally, cryptographic keys are programmed into non-volatile memory such as erasable programmable read-only memory (EPROM), which is vulnerable to physical and side-channel attacks.

Recently, approaches based on inherent physical disorders induced during fabrication have emerged as promising hardware root-of-trust cryptographic keys as they are infeasible to duplicate. The physical unclonable function (PUF) format has evolved from non-electronic devices to electronic devices such as integrated circuits, radio frequency identification tags and field-programmable gate arrays. Unfortunately, PUFs based on small mismatches can be easily disturbed by noise (e.g., supply voltage variation). Further, the current generation of PUFs generally do not support non-silicon substrate materials, which limit their application in flexible, printable or disposable solutions.

Carbon nanotubes (CNT) provide highly reliable, controllable and substrate-agnostic random structures. In one study, the National Institute of Standards and Technology (NIST) randomness test suite, which is commonly accepted as the standard for random sequence and physical randomness generation certification, was used to confirm the quality of the generated random bits of CNT-based random structures.

One key feature of an ideal security primitive is the capability to prevent any unauthorized duplication. CNT random bits possess unclonability originating from the randomness of the nanoscale diffusion and drift processes used to create the CNT random bits. Even with the same fabrication process it is impossible to clone the same CNT bits. High-resolution imaging techniques such as electron microscope imaging cannot be used to analyze the bit information as the chip de-layering processes (to expose CNTs) involving harsh plasma etching and polishing that can easily destroy the embedded CNTs.

Physical security of each individual security feature 810 item is enhanced through the random presence of impurities at the atomic level of each carbon nanotube. In order to create a counterfeit security feature, individual atoms of contaminating element(s) would need to be deposited in the respective carbon nanotube(s) in the counterfeit security feature as it was being manufactured.

Current and future carbon nanotube manufacturing processes are not able to have the ability to deposit individual atoms of contaminating element(s) into nanotube matrices due to the variability of the carbon nanotube source material—even at a purity of 99.999%, contamination by extraneous elements cannot be completely eliminated.

When low voltage is applied to each end of the security feature 810, the unique value of the carbon nanotube matrix that was deposited to the security feature 810 during manufacturing can be determined. A cryptographic hash is generated for the unique value, and optionally, other information such as the image and the image metadata. The cryptographic hash is written to a node of a transaction processing network. At a later time, authenticity of the print can be determined by evaluating the index value of the matrix of CNT security feature as read by a low voltage reader and the value of the hash written to the node of the transaction processing network.

The unique value of the carbon nanotube matrix after deposition can be compared and contrasted to the security thread in currency of the United States that is at risk of counterfeiting. By way of example, new U.S. $20 bills have a security thread embedded in the substrate of the bill that runs from top to bottom of the bill in the landscape orientation and is located approximately ¾ inch from the left edge of the bill. The security thread reads USA TWENTY repeated along the length of the thread. The U.S. Currency security thread confirms that the $20 bill is genuine, but there is no way to confirm the individual $20 bill is the only authorized $20 bill in existence (or that the $20 bill is copy 10 of 200). The CNT security strip, through its unique value (which is in turn part of the cryptographic hash value for the physical print) confirms that the physical print that contains the security strip is the only one of its kind (or copy X of a total of N authorized copies).

Though only one security feature 810 including a matrix of carbon nanotubes (CNT) is shown in FIG. 8, multiple security feature 810 can be embedded. In one example, each security feature 810 can be associated with different pieces of information. For example, a first security feature can be associated with the image file, and a second security feature can be associated with image metadata. In other examples, there can be a plurality of security features, each associated with different kinds of information, or different security features can be associated with the same data to function as a backup.

In an example, a waterfall of revenue from images and physical print products is included in the generated cryptographic hash value for the images and physical print products. Further, the waterfall is included in the published metadata that was used to generate the cryptographic hash value so that the cryptographic hash could be re-generated to determine if the original value agreed with the generated value. Here, the waterfall itself would not be stored in the substrate 820 of the physical print product, but instead is published to the blockchain for the respective cryptographic hash value.

FIG. 2 is a block diagram of a computing device 200. A computing device as used herein refers to any device with a processor, memory and a storage device that may execute instructions including, but not limited to, personal computers and server computers. These computing devices may run an operating system, including variations of the Linux, Microsoft Windows, and Apple Mac operating systems.

The computing device 200 may be representative of the frame slicing and packaging machine 120 (FIG. 1) and the production and packaging machine 520 (FIG. 5). The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 220, storage 240, a network interface 260 and an I/O interface 280. The processor 210 may be or include one or more microprocessors, field programmable gate arrays (FPGAs), application specific integrated circuits (ASICs), programmable logic devices (PLDs) and programmable logic arrays (PLAs).

The memory 220 is a non-transitory storage medium and may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210. As used herein the term memory corresponds to the memory 220 and explicitly excludes transitory media such as signals or waveforms. The techniques disclosed herein may be implemented with machine readable storage media in a storage device included with or otherwise coupled or attached to a computing device. That is, the software may be stored in electronic, machine readable media.

The storage 240 provides non-volatile, bulk or long-term storage of data or instructions in the computing device 400 and 700. The storage 240 may take the form of a magnetic or solid-state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. In some cases, such as those involving solid state memory devices, the memory 220 and storage 240 may be a single device.

The network interface 260 includes an interface to a network such as a network that can be used to communicate calls, signals, streams, arrays, flagged samples and feedback described herein. The network interface 260 may be wired or wireless.

The I/O interface 280 interfaces the processor 210 to peripherals (not shown) such as displays, video and still cameras, microphones, keyboards and USB devices.

In some cases, storage 240 is a non-volatile machine-readable storage medium that includes all types of computer readable media, including magnetic storage media, optical storage media, and solid-state storage media. The software can be installed in the frame slicing and packaging machine 120.

The technologies described herein provide various technological improvements to computer performance and efficiency. For example, the frame slicing and packaging machine 120 has performance enhancements over the prior art that results in more efficient production of an inventory of image products from frames of a digital video work. For example, the technologies described are technological improvements over those of the past because they provide verifiable provenance of images of frames that have been extracted from a motion picture, short video such as a music video, video clip, movie trailer, or individual still photographs. It is believed that there is no mechanism in the prior art to extract individual frames and concurrent with the extract, provide proof of authenticity or provenance of the extracted frames and metadata about the extracted frames.

Within this description, the terms engine or machine means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed synthesis. The synthesis may be performed automatically using a synthesis tool. The gate netlist or other physical description may be further converted into programming code for implementing the engine in a programmable device such as PLD, FPGA or PLA. The gate netlist or other physical description may be converted into process instructions and masks for fabricating the engine within an ASIC.

Some technologies described for the frame slicing and packaging machine 120, image production and packaging machine 520 and/or the computing device 200 include units. Within this description, the term unit means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card, or within a common FPGA, ASIC, or other circuit device.

Closing Comments

Throughout this description, the embodiments and examples shown should be considered as exemplars, rather than limitations on the apparatus and procedures disclosed or claimed. Although many of the examples presented herein involve specific combinations of method acts or system elements, those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine-readable device storing a program having instructions which when executed by a processor will cause the processor to manufacture an inventory of finished physical print products from a base work comprising one or more images, the instructions of the program for:
    assigning print metadata to each print of an image from the base work, the print metadata including an identification of the base work and a provenance of the base work;
    for each print, generating at least one cryptographic hash of the image, the print metadata, and an index value of a security feature embedded into a physical substrate on which the image is printed, wherein the at least one cryptographic hash comprises a plurality of cryptographic hashes, wherein one of the plurality of cryptographic hashes is associated with the image and another of the plurality of cryptographic hashes is associated with the print metadata; and
    writing the cryptographic hash to a node of a transaction processing network.

2. The apparatus of claim 1, wherein the instructions are further for extracting the image in an analog form from a physical medium and converting the image to digital form.

3. The apparatus of claim 1 wherein the base work is a still image.

4. The apparatus of claim 1 wherein the base work is a movie.

5. The apparatus of claim 4 wherein the print metadata further includes an identification of the frame within the movie.

6. The apparatus of claim 1 wherein the security feature embedded into the physical substrate comprises at least one matrix of carbon nanotubes.

7. The apparatus of claim 6 wherein the at least one matrix of carbon nanotubes comprises a plurality of matrices of carbon nanotubes.

8. The apparatus of claim 1 wherein the print metadata includes color compositions within the print.

9. The apparatus of claim 1 wherein the print metadata includes tags describing at least one of the image content, a geographic location where the image was recorded, and a geographic location of where the image content is represented to be.

10. The apparatus of claim 1 wherein the transaction processing network is a blockchain ledger.

11. The apparatus of claim 1 wherein the at least one cryptographic hash is an individual file, such that there is one file produced for each print of the image from the base work.

12. The apparatus of claim 1 further comprising adding a watermark to the cryptographic hash before it is written to the node.

13. A method of manufacturing an inventory of finished physical print products from a base work comprising one or more images, the method comprising:
    assigning print metadata to each print of an image from the base work, the print metadata including an identification of the base work and a provenance of the base work;
    for each print, generating at least one cryptographic hash of the image, the print metadata, and an index value of a security feature embedded into a physical substrate on which the image is printed, wherein the at least one cryptographic hash comprises a plurality of cryptographic hashes, wherein one of the plurality of cryptographic hashes is associated with the image and another of the plurality of cryptographic hashes is associated with the print metadata; and
    writing the cryptographic hash to a node of a transaction processing network.

14. The method of claim 13 further comprising extracting the image in an analog form from a physical medium and converting the image to digital form.

15. The method of claim 13 wherein the base work is a still image.

16. The method of claim 13 wherein the base work is a movie.

17. The method of claim 16 wherein the print metadata further includes an identification of the frame within the movie.

18. The apparatus of claim 13 wherein the security feature embedded into the physical substrate comprises at least one matrix of carbon nanotubes.

19. The method of claim 18 wherein the at least one matrix of carbon nanotubes comprises a plurality of matrices of carbon nanotubes.

20. The method of claim 13 wherein the print metadata includes color compositions within the print.

21. The method of claim 13 wherein the print metadata includes tags describing at least one of the image content, a geographic location where the image was recorded, and a geographic location of where the image content is represented to be.

22. The method of claim 13 wherein the transaction processing network is a blockchain ledger.

23. The method of claim 13 wherein the at least one cryptographic hash is an individual file, such that there is one file produced for each print of the image from the base work.

24. The method of claim 13 further comprising adding a watermark to the cryptographic hash before it is written to the node.

* * * * *